Dec. 15, 1964  V. F. GONGOLL ETAL  3,161,491
RESPIRATOR FILTER UNIT
Filed March 15, 1961
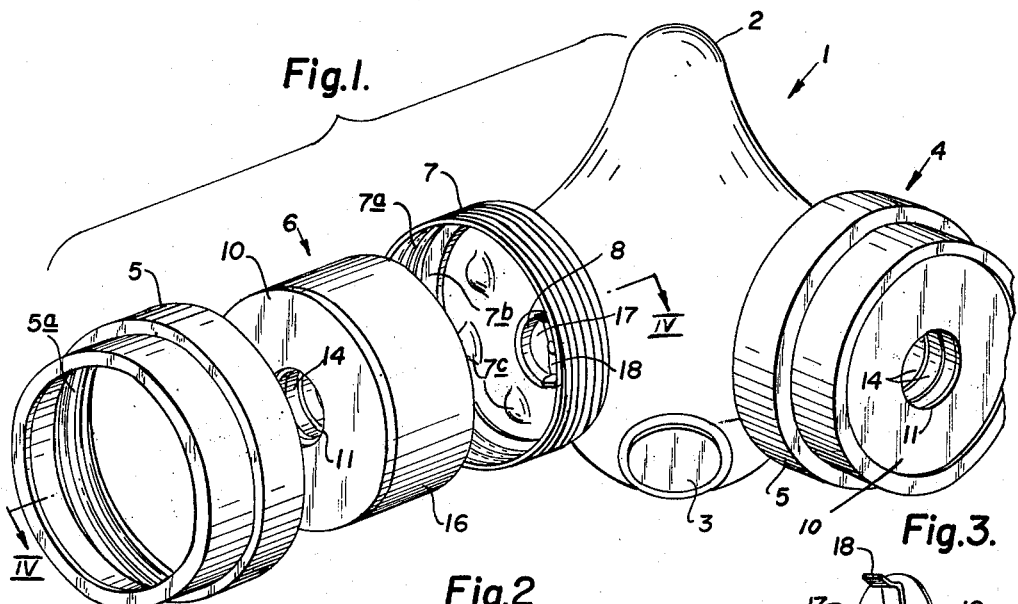
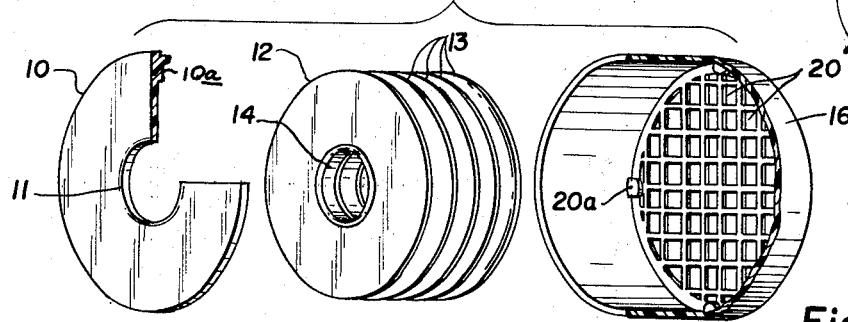
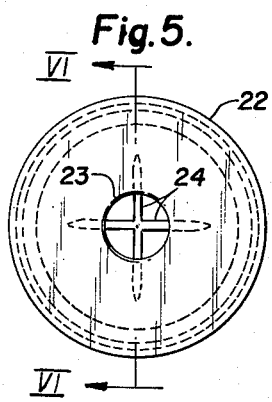
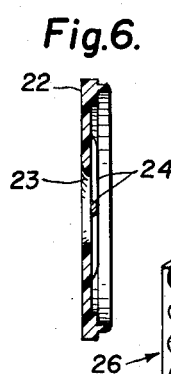
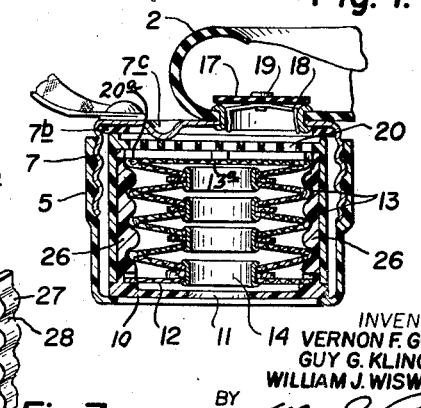
INVENTORS.
VERNON F. GONGOLL
GUY G. KLINGER &
WILLIAM J. WISWESSER
BY
William J. Ruano
ATTORNEY

United States Patent Office 3,161,491
Patented Dec. 15, 1964

3,161,491
RESPIRATOR FILTER UNIT
Vernon F. Gongoll, Shillington, Guy G. Klinger, Wernersville, and William J. Wiswesser, Reading, Pa., assignors to The Electric Storage Battery Company, Philadelphia, Pa.
Filed Mar. 15, 1961, Ser. No. 95,989
2 Claims. (Cl. 55—502)

This invention relates to respirators for protection against dust and fumes in industrial plants, and, more particularly, relates to a filter unit for such respirators.

An outstanding disadvantage of conventional filter units for respirators is that they are unprotected from damage that may be caused through handling, inasmuch as the filter unit is fragile and often times made of paper, which damage would impair its filtering effectiveness.

Another disadvantage of well known types of respirator filter units is that the filter, when enclosed in its retaining cup, cannot be observed to see whether it is sealed tightly and devoid of damage, therefore in good operating condition, or perhaps whether abnormally coated with dust.

Still another disadvantage of filter units of well known types for use in respirators is that they provide no simple way of testing the effectiveness of the face fit, and this can be done, in many instances, only by adhering a paper layer over the perforated inlet surface of the filter, which usually covers a very large area.

An object of the present invention is to provide a respirator filter unit which is self-contained in a casing that provides protection against damage of the filter while handling, and which casing is of transparent plastic material to enable viewing of the filter to assure that there are no damaged parts and that the parts of the filter are in proper relationship, including the sealing ring and other associated parts thereof.

A further object of the invention is to provide a novel respirator filter unit or cartridge of such construction that the accordion filter pad therein will always be maintained in proper position to minimize breathing resistance and to assure optimum efficiency and long life of the respirator.

A still further object of the invention is to provide a respirator filter which provides a tight-sealing, rounded rim that engages the cup gasket and which enables testing of the effectiveness of the filter by the simple expedient of placing the thumb on a hole forming the air inlet opening of the filter unit and thereafter breathing in through the respirator.

Other objects and advantages will become more apparent from a study of the following description taken with the accompanying drawing wherein:

FIG. 1 is a perspective view of a respirator provided with a filter unit embodying the principles of the present invention and wherein the filter unit is shown in exploded relationship with respect to its enclosing casing;

FIG. 2 is an exploded, perspective view of the filter unit 6 shown in FIG. 1;

FIG. 3 is an enlarged, perspective view of the inhalation valve shown in FIG. 1;

FIG. 4 is a cross-sectional view taken along line IV—IV of FIG. 1 when the parts are in assembled condition;

FIG. 5 is a plan view of a modified form of cover to take place of cover 10 of the filter unit 6;

FIG. 6 is a cross-sectional view taken along line VI—VI of FIG. 5; and,

FIG. 7 is a perspective view of one of the separator or spacer elements 26 shown in FIG. 4.

Referring more particularly to FIGS. 1, 2 and 3 of the drawing, numeral 1 generally denotes a respirator comprising a facepiece 2 of rubber or other suitable flexible material of substantially cup-shape and of pear shaped outline so as to surround the nose, cheeks and chin of the wearer in a dust-tight manner. It has an exhalation valve 3 of well known construction.

A pair of filter assemblies 4 are provided on the respective sides of the face piece 2, the one on the right being shown assembled and the one on the left being shown disassembled for the purposes of clarity. An annular cover 5 of metal or suitable plastic material, either opaque or transparent, is provided with internal threads 5a which are adapted to screw onto threads 7a formed on the collar portion of a filter casing or cup 7 which is rigidly mounted on the facepiece 2 by grommets 8. Protuberances or projections 7c are normally provided on the base of cup 7. However, gasket 7b provides a separation between the encased filter unit and cup base as shown in FIG. 4.

An inhalation valve is provided, as shown in FIG. 3, comprising a rubber diaphragm 17 which is mounted on a substantially U-shaped clip 18 by means of a stud 19, which clip is detachably clipped onto the inner surface portion of grommet 8. The features heretofore described are well known in the art.

An important feature of the invention resides in the specific construction of the filter unit 6 and its relationship to the surrounding filter housing. The component parts of the filter casing 6 are shown separately in FIG. 2 and comprise a transparent or opaque plastic cover ring 10 having a central air inlet hole 11 and a peripheral or annual projection 10a to provide a seal against a peripheral surface of the base filter ring 12 of an accordion shaped filter of asbestos-impregnated paper or other suitable material and comprising a plurality of accordion bellow or pleats 13 held together by grommets 14. A cup shaped casing 16 is provided which is also of transparent plastic material and the other end or bottom of such casing is preferably in the form of a grid 20, also of transparent plastic material, having a plurality of lugs 20a projecting from spaced portions of its periphery so as to space the filter disc 13a from the grid 20 to permit passage of air along the outer surface of filter disc 13a from the spaces surrounding the accordion pleats 13. In other words, lugs 20a prevent "bottoming" of the filter disc 13a or sealing along a peripheral portion which would otherwise prevent passage of air surrounding the pleats to the space above filter disc 13a, as viewed in FIG. 4. The three component parts of the filter unit 6 are assembled in the manner shown in FIG. 4, that is, with the cover ring 10 cemented or otherwise hermetically sealed to the periphery of the mouth portion of the casing 16 so as to provide a self-contained, disposable unit.

The diameter of the air inlet hole 11 is of the order of ¾ inch, which enables it to be completely closed or plugged by the thumb of the wearer when he desires to test the effectiveness of the face fitting and the various seals provided in the respirator. Thus by simply placing each thumb over the respective holes 11 and breathing in, the wearer can very quickly determine whether the seals are tight, thereby providing a very convenient and simple manner of testing the respirator before each use in a dust or radiologically contaminated area. The construction shown in FIG. 2 is especially useful when it is desired to measure the intensity of alpha radiation particles which deposit on the interior surface of the filter disc 13a. This could be done by inserting a probe of a miniaturized alpha radiation measuring instrument through opening 11 and against the alpha particle coated surface of filter disc 13a.

As shown more clearly in FIGS. 4 and 7, a plurality of separator or spacer elements 26 are included within the filter casing, there being two of such elements shown in diametrically opposite relationship, although it will be understood that three or four of such elements may be used. Separator elements 26 are preferably of plastic material and are cemented or sealed in position within casing 16 so that the outer folds or pleats 13 of the accordion filter are contained within the depressions 28 formed between projections 27. If desired, an additional projection 27 may be extended beyond the filter disc 13a to provide a greater spacing between it and the grid 20.

FIGS. 5 and 6 show a modified form of the cover ring 10 of FIG. 2 for use in dust-laden atmospheres. The cover ring 22 is also of transparent plastic material and has a central opening 23 of the same size as opening 11. Ribs 24 are integrally formed on the inside wall surface and are in the form of a cross, which ribs are also of transparent plastic material, and which not only enhance the appearance of the cover, but provide a guard for preventing unauthorized probing through hole 23 by the fingers or with a pencil which might otherwise damage the filter.

In view of the transparency of the entire wall portion of the filter unit or cartridge 6, the condition of the filter may be viewed at all times, even when assembled, and the filter will be protected at all times, such as during assembly and during disassembly for the purpose of sterilizing the respirator.

In the use of the filter, when air is inhaled through the respirator, outside air will flow in through hole 11 but will be blocked by sealing ring 10a from flowing radially outwardly and instead will be confined to the interior of the accordion filter and will flow outwardly only through the various wall portions of the filter. Filtered air will flow upwardly (as viewed in FIG. 4) along the peripheral space in which separators 26 are positioned, and will flow around the topmost pleat into the space formed by separator lugs 20a and through the openings of the grid 20 and thence through the inhalation valve diaphragm 17. It will be noted that the grid shape of the perforations 20 provide maximum area of opening for the bottom or end wall of the filter casing.

Thus it will be seen that we have provided an efficient filter unit and assembly which is adapted for use in respirators and which, by virtue of the transparency of the casing, enables observation at all times of the enclosed filter, and which encloses elements for centering and properly positioning the filter to assure minimum breathing resistance and maximum effectiveness of the filter; furthermore, we have provided a filter unit or casing of such construction that it enables testing of various seals in the respirator by merely plugging the inlet holes thereof by the thumbs and thereby providing an easy and quick test which may be made in contaminated areas before each use of the respirator, which gives the wearer a greater feeling of security and reliance upon the operating condition of the respirator and filter; furthermore, we have provided a self contained, disposable filter unit which not only protects the filter against damage through handling, but which is adapted to fit conventional types of respirators in which uncovered filters are presently used.

While we have illustrated and described several embodiments of our invention, it will be understood that these are by way of illustration only, and that various changes and modifications may be made within the contemplation of our invention and within the scope of the following claims.

We claim:

1. A respirator filter unit comprising an accordion filter including a base filter ring and a filter disc with according pleats therebetween, a hollow cylindrical casing of transparent plastic material comprising an outer end face immediately adjacent said ring and having a central hole of the order of ¾ inch in diameter in registery with the opening in said ring to provide an air inlet to the interior of said filter, a peripheral sealing ring for forming a seal with the peripheral portion of said filter ring, the opposite end face of said casing being perforated, spacing means for spacing said filter disc from said perforated end, there being no other air inlet openings in the casing, whereby plugging of the central hole in the first mentioned end face will completely seal out atmospheric air, and separating means extending along the inner walls of said casing for separating said pleats.

2. A filter unit as recited in claim 1 wherein said separating means comprises a plurality of peripherally spaced, longitudinally extending elements of sinuous outline seating the outer pleats of said accordion filter to maintain the pleats in spaced relationship and for centering the filter.

References Cited by the Examiner

UNITED STATES PATENTS

| 1,731,061 | 10/29 | Rochester | 55—462 |
| 2,008,677 | 7/35 | Booharin | 128—146 |
| 2,104,016 | 1/38 | Biggs | 128—146 |
| 2,235,624 | 3/41 | Schwartz | 128—146 |
| 2,744,525 | 5/56 | Whipple | 128—146 |
| 2,915,426 | 12/59 | Poelman | 55—521 XR |
| 2,990,032 | 6/61 | Sandvig | 55—274 |

FOREIGN PATENTS

| 200,188 | 12/38 | Switzerland. |

RICHARD A. GAUDET, *Primary Examiner.*

WALTER BERLOWITZ, *Examiner.*